(12) United States Patent
Holtom (10) Patent No.: US 11,125,769 B2
(45) Date of Patent: Sep. 21, 2021

(54) WIND VECTOR FIELD MEASUREMENT SYSTEM

(71) Applicant: Wind Farm Analytics Ltd, Glasgow (GB)

(72) Inventor: Theodore Cosmo Holtom, Glasgow (GB)

(73) Assignee: Wind Farm Analytics Ltd, Glasgow (GB)

( * ) Notice: Subject to any disclaimer, the term of this patent is extended or adjusted under 35 U.S.C. 154(b) by 516 days.

(21) Appl. No.: 15/755,975

(22) PCT Filed: Sep. 13, 2016

(86) PCT No.: PCT/GB2016/052826
§ 371 (c)(1),
(2) Date: Feb. 27, 2018

(87) PCT Pub. No.: WO2017/042594
PCT Pub. Date: Mar. 16, 2017

(65) Prior Publication Data
US 2018/0246138 A1 Aug. 30, 2018

(30) Foreign Application Priority Data

Sep. 13, 2015 (GB) .................................... 1516169

(51) Int. Cl.
*G01P 5/26* (2006.01)
*G01S 17/95* (2006.01)
(Continued)

(52) U.S. Cl.
CPC .............. *G01P 5/26* (2013.01); *F03D 7/0224* (2013.01); *F03D 7/048* (2013.01); *F03D 17/00* (2016.05);
(Continued)

(58) Field of Classification Search
None
See application file for complete search history.

(56) References Cited

U.S. PATENT DOCUMENTS

| 9,026,278 B2 * | 5/2015 | Dakin | G01N 21/53 |
| | | | 701/14 |
| 2002/0029128 A1 * | 3/2002 | Jones | G01B 21/04 |
| | | | 702/152 |

(Continued)

FOREIGN PATENT DOCUMENTS

| CN | 202221433 | 5/2012 |
| CN | 103635812 | 3/2014 |

(Continued)

OTHER PUBLICATIONS

"Simulation of motion induced measurement errors for wind measurements using LIDAR on floating platforms" Gerrit Wolken-Möhlmann, Bernhard Lange (Year: 2010).*

(Continued)

*Primary Examiner* — Yuqing Xiao
*Assistant Examiner* — Amir J Askarian
(74) *Attorney, Agent, or Firm* — Colby Nipper PLLC (57) ABSTRACT

A three-dimensional wind vector field measurement system employs convergent beams for localised velocity measurement enabling mapping of the wind field across an extended spatial region. This enables characterisation of complex field signatures. This enables advanced control and protective systems for wind turbines. This also enables improved wind harvesting. This also enables improved prospecting. This also enables improved equipment selection. Buoy mounted systems enable measurement in an offshore environment.

20 Claims, 5 Drawing Sheets

(51) Int. Cl.
*G01S 13/95* (2006.01)
*G01S 17/58* (2006.01)
*F03D 17/00* (2016.01)
*F03D 7/02* (2006.01)
*F03D 7/04* (2006.01)

(52) U.S. Cl.
CPC ............ *G01S 13/956* (2013.01); *G01S 17/58* (2013.01); *G01S 17/95* (2013.01); *Y02A 90/10* (2018.01)

(56) References Cited

U.S. PATENT DOCUMENTS

| | | | |
|---|---|---|---|
| 2006/0106317 A1* | 5/2006 | McConnell | A61B 5/0059 600/476 |
| 2010/0045965 A1* | 2/2010 | Meneely | G01S 17/10 356/5.01 |
| 2012/0176476 A1* | 7/2012 | Schmidt | G01S 17/894 348/46 |
| 2012/0274937 A1 | 11/2012 | Hays et al. | |
| 2013/0094961 A1 | 4/2013 | Couchman et al. | |
| 2013/0314694 A1* | 11/2013 | Tchoryk, Jr. | G01N 21/45 356/28.5 |
| 2015/0233962 A1* | 8/2015 | Tchoryk | G01S 7/4818 356/28.5 |

FOREIGN PATENT DOCUMENTS

| | | | | |
|---|---|---|---|---|
| CN | 104011562 | | 8/2014 | |
| EP | 2617993 | | 7/2013 | |
| EP | 2795344 | B1 * | 7/2017 | ............... G01P 5/26 |
| GB | 2515578 | | 12/2014 | |
| JP | 201048810 | | 9/2011 | |
| JP | 2013148058 | | 8/2013 | |
| JP | 2015502540 | | 1/2015 | |
| WO | WO-2009004308 | A2 * | 1/2009 | ........... F03B 13/264 |
| WO | 2013079099 | | 6/2013 | |
| WO | 2013092746 | | 6/2013 | |
| WO | 2017042594 | | 3/2017 | |

OTHER PUBLICATIONS

"Examination Report", GB Application No. GB1715256.2, dated Jan. 9, 2018, 3 pages.
"Examination Report", GB Application No. GB1715256.2, dated Feb. 2, 2018, 1 page.
"Examination Report", GB Application No. GB1715256.2, dated Oct. 24, 2017, 2 pages.
"International Search Report and Written Opinion", PCT Application No. PCT/GB2016/052826, dated Jan. 30, 2017, 20 pages.
"Foreign Office Action", EP Application No. 16784549.4, dated Oct. 4, 2019, 6 pages.
"Foreign Office Action", CN Application No. 201680053119.2, dated Jan. 21, 2020, 32 pages.
"Foreign Office Action", JP Application No. 2018-512380, dated Jul. 21, 2020, 9 pages.
"Foreign Office Action", EP Application No. 16784549.4, dated Jul. 27, 2020, 5 pages.

* cited by examiner

WIND VECTOR FIELD MEASUREMENT SYSTEM

FIELD

The present invention describes wind vector field measurement systems and in particular new systems and methods of flow field measurement for application in areas such as renewable energy.

BACKGROUND

A wind turbine is well known to someone skilled in the art. A wind turbine may have a vertical axis or a horizontal axis of rotation. In this text a wind turbine refers also to a wind pump or compressor where rotational torque is employed for purposes of pumping or compressing a fluid. A fluid may be a liquid or a gas. It is appreciated that a wind turbine may be mounted on land, referred to as onshore wind turbine, or at sea, referred to as offshore wind turbine. Offshore wind turbines may be deployed in inland lakes as well as in shallow or deep sea water. An offshore wind turbine may have a floating foundation or a fixed foundation. A floating foundation may be tethered. Various types of foundation are known including but not limited to piles driven into the seabed, gravity foundations, jackets and lattice structures. A transition piece may connect the foundation with the wind turbine tower base. Various materials can be used in the construction including but not limited to steel. A wind turbine may or may not incorporate energy storage. A wind turbine may export electrical power to a transmission or distribution network. Alternatively, the power from a wind turbine may be employed directly within a localised electrical grid, also known as a grid island.

LIDAR is well known to someone skilled in the art. SONAR, SODAR and RADAR are also well known to someone skilled in the art. The Doppler effect and the method of measuring, estimating or calculating radial velocity components is also well known to someone skilled in the art.

A meteorological mast is well known to someone skilled in the art. Meteorological masts have been used in the wind industry for gathering wind data from point measurement instruments mounted at various heights. Ground based LIDAR and buoy based LIDAR has been used as an alternative to deploying a meteorological mast. LIDAR is considered advantageous since it is easier to achieve measurement at higher heights, whereas physical meteorological masts employed in the industry are being outsized by the larger wind turbines. Instruments mounted on a meteorological mast (also referred to as "met mast") suffer measurement errors due to shadowing effects of the mast and its boom structures whereas LIDAR is considered to be a non-invasive remote sensing measurement technology.

However, the LIDAR used by the wind industry employs diverging beams, meaning that different velocity components are combined from different points in space which are widely separated, especially at the uppermost heights. Therefore, the combination of such components into a wind velocity vector at a given height represents an average wind velocity over a large volume, or alternatively represents an assumption of uniform flow across that large volume.

The use of diverging LIDAR beams is especially problematic for characterising turbulence and turbulence intensity. Wind turbine classification refers to turbulence intensity as measured by a point-like instrument such as those typically mounted on a meteorological mast. A benefit of the present invention is to ensure localisation of the LIDAR measurement volume so that it approaches a point-like instrument. This enables the localised measurement of turbulence intensity.

The use of converging beams, aimed to intersect one another at the chosen measurement point, enables many other wind field characteristics to be measured, such as wind veer and wind shear which are traditionally derived from mast-mounted point-like anemometer or wind vane instruments.

SUMMARY OF THE INVENTION

New systems of converging beam Doppler velocity measurement enable advanced control, improved energy harvesting, advanced protection systems, improved prospecting and improved equipment selection.

This invention describes a three-dimensional vector field measurement system enabling mapping characterisation of complex field characteristics. The invention enables advanced control and protective systems. The invention also enables improved harvesting. The invention also enables improved prospecting. The invention also enables improved equipment selection.

According to a first aspect of the invention there is provided a measurement system for measuring a vector field at a measurement locale comprising: a floating buoy; a plurality of beam transceivers mounted on the floating buoy for emitting beams and receiving reflected or scattered beams, and being arranged such that beams emitted by the beam transceivers intersect at the measurement locale.

Optionally, said measurement system further comprises: a control system arranged to change a direction the beams emitted from the beam transceivers; position sensing equipment enabling measurement of the displacement of the floating buoy from a nominal operating position; attitude sensing equipment arranged to measure an orientation of the floating buoy; and wherein said position sensing equipment and said attitude sensing equipment provide readings to the control system to adjust the beam steering to take account of motion of the floating buoy.

Herein, a buoy can refer to any type of floating structure. A beam source may in some embodiments comprise a source that emits a narrow unidirectional flow of electromagnetic radiation, although it is to be emphasized that the invention is not limited to electromagnetic solutions, encompassing other types of beams such as SODAR or other acoustic beam sources.

In the example of a LIDAR beam source, very accurate milliradian beam steering of lasers is possible with equipment employing galvanometers, MEMS gratings, micromirrors, decentered lens arrays, rotating wedges or other beam steering systems.

Optionally, the vector field is a fluid velocity.

Optionally, the measurement system comprises a frame which carries a plurality of beam transceivers.

Optionally, the floating buoy is provided with or forms a column structure.

Optionally, a frame is affixed to the column structure.

Optionally, the column structure comprises a meteorological mast.

Optionally, one or more of the transceivers comprises a spatially separated transmitter and receiver.

Optionally, the system is programmed or calibrated with reference position data or reference orientation data.

Optionally, the control system selects certain beams from the plurality of beam transceivers which are chosen to intersect at the measurement locale.

Optionally, the beam selection is based on data from position and/or orientation sensors.

Optionally, the control system comprises beam steering means or beam switching means.

Optionally, transmitted and received beam parameters such as frequency are measured and compared in order to calculate a Doppler shift thereby indicating a relative line of sight velocity component.

Optionally, the beams are employed to measure or estimate other characteristics of the probed medium, such as density, turbulence intensity, flow inclination angle with respect to any plane such as the horizontal plane, horizontal wind veer, vertical wind veer, horizontal wind shear, vertical wind shear, horizontal wind direction, wind speed (wind velocity magnitude), vertical wind speed or horizontal wind speed.

Optionally, successive measurements in time are combined to measure or estimate rates of change of parameters of the probed medium.

Optionally, a plurality of measurements are combined into a vector field spatial map extending through a region of space.

Optionally, a plurality of measurements are combined into a vector field temporal map extending through a region of time.

Optionally, the beams are SODAR beams.

Optionally, the beams are RADAR beams.

Optionally, the beams are LIDAR beams.

Optionally, the beams are Doppler LIDAR beams

Optionally, the beams are Continuous Wave (CW) LIDAR beams or pulsed LIDAR beams.

Optionally, two or more beams originate from two or more independent floating buoys where the system combines data from the independent buoys in order to reconstruct parameters of the wind vector field.

Optionally, wind vector field measurement data is provided to a wind turbine control system.

Optionally, wind vector field measurement data is combined with condition monitoring system data Optionally, the control system utilises the measurement data in order to harvest more energy from the wind.

Optionally, the control system utilises the measurement data in order to trigger alarms and protective measures in order to reduce or avoid damage to components.

Optionally, the plurality of beam transceivers are fixed to the floating buoy or a frame with tension straps, elastic straps, buckles, ratchet straps, drilling and bolting, use of glue/bonding agent, use of brackets, use of magnets, locking joint, etc.

Optionally, the fixing method is adjustable in size such that a single product may be fitted to many types of wind turbine tower, many types of buoy structure and many types of meteorological mast structure.

Optionally, the frame structure is conveniently collapsible, stowable or removeable in order to avoid interference with maintenance actions such as winching of equipment from above.

Optionally, the frame is borne on a yaw ring around the column and may be rotated around the column by a yaw motor system.

Optionally, measurements are analysed to derive a fluid density value.

Optionally, successive velocity measurements are employed to produce fluid acceleration measurements, or higher time derivatives of vector displacement.

Optionally, a plurality of beam sources transmit at differing frequencies, pulse repetition frequencies or with different polarisation characteristics.

Optionally, the measurement data is provided to a wind turbine condition monitoring system.

Optionally, the measurement data is provided to a wind turbine control system.

Optionally, the beams are encoded by frequency, polarisation or pulse chain interval encoding in order to discriminate between the different beams.

Optionally, the orientation measured by the attitude sensing equipment comprises roll, pitch and yaw angle data.

According to a second aspect of the invention there is provided a method of measuring a vector field at a measurement locale comprising: providing a plurality of beam transceivers at a floating buoy; the beam transceivers emitting beams and receiving reflected or scattered beams Optionally, the method further comprises measuring the displacement of the floating buoy from a nominal operating position; measuring an orientation of the floating buoy; and wherein changing a direction of the beams emitted from the beam transceivers based on measured displacement, roll, pitch, and yaw angle to take account of the motion of the floating buoy.

According to a third aspect of the disclosure there is provided a computer program product for implementing any of the above claims.

Optionally, the computer program product comprises instructions for a control system for steering the beam sources.

Optionally, the computer program product comprises instructions for a turbine control system to receive inputs from velocimetry measurements, make calculations and provide command signals for controlling turbine components.

Optionally, the computer program product comprises instructions for analysing outputs of a velocimetry measurement system and performing various calculations for making predictions and measurements.

According to a fourth aspect of the invention there is provided a measurement system comprising a column; a frame; and a plurality of beam transceivers mounted on the frame for emitting beams and receiving reflected or scattered beams, and being and arranged such that beams emitted by the beam transceivers intersect at a measurement locale.

Optionally, the column is a meteorological mast.

Optionally, the column is a wind turbine tower.

Optionally, the column is a floating buoy.

The fourth aspect may also comprise any of the above features of the first, second and third aspects as described above where applicable.

The invention may also comprise one or more of the following integers:

Integer 1. A system consisting of a plurality of intersecting beam transceivers which are mounted on one or many frames attached to one or more columns, wherein the beams are arranged with the aim of converging at an intended measurement location Integer 2. Integer 1 where a column is a wind turbine tower Integer 3. Integer 1 where a column is a floating buoy Integer 4. Integer 1 where a column is a meteorological mast Integer 5. Any of the previous integers where a transceiver is replaced with a receiver
Integer 6. Any of the previous integers where a transceiver is replaced with a transmitter
Integer 7. Any of the previous integers where the beams are switchable in direction
Integer 8. Any of the previous integers where the beams are steerable in direction
Integer 9. Any of the previous integers where the system includes one or more position sensors
Integer 10. Any of the previous integers where the system includes one or more orientation sensors
Integer 11. Any of the previous integers where the system is programmed or calibrated with reference position data.
Integer 12. Any of the previous integers where the system is programmed or calibrated with reference orientation data.
Integer 13. Any of the previous integers where the system includes a control system used to select, steer or switch beams in order that they intersect at or near chosen measurement locations
Integer 14. Any of the previous integers where the system calculates beam steering corrections according to data from position sensors
Integer 15. Any of the previous integers where the system calculates beam steering corrections according to data from orientation sensors
Integer 16. Any of the previous integers where the system calculates beam selection according to data from position sensors
Integer 17. Any of the previous integers where the system calculates beam selection according to data from orientation sensors
Integer 18. Any of the previous integers where the transmitted and received beam parameters such as frequency are measured and compared in order to calculate a Doppler shift thereby indicating a relative line of sight velocity component.
Integer 19. Any of the previous integers where the beams are employed to measure or estimate other characteristics of the probed medium, such as density, turbulence intensity, flow inclination angle with respect to any plane such as the horizontal plane, horizontal wind veer, vertical wind veer, horizontal wind shear, vertical wind shear, horizontal wind direction, wind speed (wind velocity magnitude), vertical wind speed or horizontal wind speed.
Integer 20. Any of the previous integers where successive measurements in time are combined to measure or estimate rates of change of parameters of the probed medium.
Integer 21. Any of the previous integers where a plurality of measurements are combined into a vector field spatial map extending through a region of space
Integer 22. Any of the previous integers where a plurality of measurements are combined into a vector field temporal map extending through a region of time
Integer 23. Any of the previous integers where the beams are SODAR beams
Integer 24. Any of the previous integers where the beams are RADAR beams
Integer 25. Any of the previous integers where the beams are LIDAR beams
Integer 26. Any of the previous integers where the beams are Doppler LIDAR beams
Integer 27. Any of the previous integers where the beams are Continuous Wave (CW) LIDAR beams
Integer 28. Any of the previous integers where the beams are Pulsed LIDAR beams
Integer 29. Any of the previous integers where two or more beams originate from two or more independent buoys where the system combines date from the independent buoys in order to reconstruct parameters of the wind vector field.
Integer 30. Any of the previous integers where the wind vector field measurement data is provided to a wind turbine control system.
Integer 31. Any of the previous integers where the wind vector field measurement data is combined with condition monitoring system data
Integer 32. Any of the previous integers where the control system utilises the measurement data in order to harvest more energy from the wind.
Integer 33. Any of the previous integers where the control system utilises the measurement data in order to trigger alarms and protective measures in order to reduce or avoid damage to components.
Integer 34. Any of the previous integers including a fixing method consisting of tension straps, elastic straps, buckles, ratchet straps, drilling and bolting, use of glue/bonding agent, use of brackets, use of magnets, locking joint, etc.
Integer 35. The previous integer where the fixing method is adjustable in size such that a single product may be fitted to many types of wind turbine tower, many types of buoy structure and many types of meteorological mast structure.
Integer 36. Any of the previous integers where the LIDAR frame structure is conveniently collapsible, stowable or removable in order to avoid interference with maintenance actions such as winching of equipment from above.
Integer 37. Any of the above integers where the LIDAR frame is borne on a yaw ring around the column and may be rotated around the column by a yaw motor system.
Integer 38. Any of the above integers wherein measurements are analysed to derive a fluid density value.
Integer 39. Any of the above integers wherein successive velocity measurements are employed to produce fluid acceleration measurements, or higher time derivatives of vector displacement.
Integer 40. Any of the above integers wherein a plurality of beam sources transmit at differing frequencies, pulse repetition frequencies or with different polarisation characteristics.
Integer 41. Any of the above integers wherein the measurement data is provided to a wind turbine condition monitoring system.
Integer 42. Any of the above integers wherein the measurement data is provided to a wind turbine control system.
Integer 43. Any of the above integers where the beams may be encoded by frequency, polarisation or pulse chain interval encoding in order to discriminate between the different beams.
Integer 44. A computer program product for implementing any of the above integers.
Integer 45. The computer program product comprising instructions for a control system for steering the beam sources.

Integer 46. The computer program product comprising instructions for a turbine control system to receive inputs from velocimetry measurements, make calculations and provide command signals for controlling turbine components.

Integer 47. The computer program product comprising instructions for analysing outputs of a velocimetry measurement system and performing various calculations for making predictions and measurements.

The computer program products of the above aspects and integers may be stored on or transmitted as one or more instructions or code on a computer-readable medium. Computer-readable media includes both computer storage media and communication media including any medium that facilitates transfer of a computer program from one place to another. A storage media may be any available media that can be accessed by a computer. By way of example such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fibre optic cable, twisted pair, digital subscriber line (DSL), or wireless technologies such as infra-red, radio, and microwave, then the coaxial cable, fibre optic cable, twisted pair, DSL, or wireless technologies such as infra-red, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

DETAILED DESCRIPTION

The invention covers an intersecting beam LIDAR system for making a series of three-dimensional (3d) wind velocity measurements through mounting optical heads on a frame of known dimensions on a column. The beams may be steerable or switchable in direction. The relative positioning of the optical heads may then be employed in the combination of three or more LIDAR measurements in order to aim the beams and reconstruct three-dimensional wind velocity at a chosen measurement location.

The invention addresses the problem of wind industry LIDAR systems utilising diverging beams which results in the combination of LIDAR component measurements from widely separated regions in space. This is problematic since the wind vector field can vary substantially between these measurement regions. The invention described here deliberately converges beams at a single point in space, or a small region around the intended measurement point. Therefore, the components may be meaningfully combined to provide a measured wind vector at that location. This is superior to the use of diverging beams such as in a conical scan where the action of combining measured components from different locations in space effectively averages the velocity measurement over the extended region in space, or erroneously assumes that the wind vector field is uniform across that region.

In particular, the invention covers a steerable intersecting beam LIDAR system for making a series of 3d wind velocity measurements where beams are emitted (and/or received) from buoy mounted devices.

The invention also covers steerable intersecting beam LIDAR system for making a series of 3d wind velocity measurements where beams are emitted (and/or received) from turbine tower mounted devices.

The invention also covers steerable intersecting beam LIDAR system for making a series of 3d wind velocity measurements where beams are emitted (and/or received) from meteorological mast mounted devices.

It is appreciated that a true point-like instrument does not exist since a physical anemometer or wind vane has a spatial extent, but nevertheless the aim and intention is to achieve measurement at a point. It is also appreciated that intersecting or converging beams need not intersect perfectly in order to achieve a localised measurement. It is accepted that beams may have a non-zero waist or profile. It is accepted that a continuous wave (CW) laser beam may have a focal extent which is non-zero. For instance, a CW laser may be focused to within centimetres or metres of an intended measurement location. It is accepted that a beam steering system may not intersect multiple beams perfectly through one another but nevertheless may intersect a measurement locale surrounding the intended ideal measurement point within a certain tolerance, such as within some centimetres (for example 10 centimetres) or within some metres (for example 10 metres). It is also accepted that a pulsed laser LIDAR may have timing gates (also known as "range gates") within its signal processing which imply a spatial extent of measurement range which could extend over some centimetres (for example 10 centimetres) or some metres (for example 10 metres). The imperfection in measurement localisation is acceptable for an intersecting beam LIDAR and should be taken into account when analysing data from such systems. However, modern wind turbines have grown such that rotor diameters above 125 metres are now commonplace and therefore a measurement system capable of resolving or mapping the wind vector field through measurements within a locale of some metres (for example ten metres or less) are beneficial for measuring the variation in wind field across a large wind turbine rotor area.

This invention focuses preferably on a LIDAR (Light Detection and Ranging) measurement system. The invention relates potentially to other beam measurement systems such as RADAR (Radio Detection and Ranging) or SODAR (Sonic Detection and Ranging).

A transceiver consists of a single device including both transmitter and receiver. A transceiver may share optical components, such as telescope, and optical path between transmitted and received radiation. Alternatively, optical components may not be shared. For instance, a transceiver may include a transmit telescope and a receive telescope, very slightly offset from one another in position and/or angle.

It is well known that LIDAR can operate on the basis of substantially co-located transmitter and receiver (a transceiver), sometimes referred to as monostatic LIDAR. It is also known that LIDAR can operate on the basis of spatially separated transmitter and receiver, sometimes referred to as bistatic LIDAR.

It is well known that Doppler LIDAR may measure the radial component of wind velocity by measuring the Doppler frequency shift in radiation reflected from aerosols or other particles carried upon the wind. Such particles may include but not be limited to sea spray droplets, dust, ash, pollen or molecules.

It is well known that LIDAR can operate in a Continuous Wave (CW) mode, where the measurement range is determined by focus. CW systems are considered advantageous at short ranges such as 10 metres, 100 metres, or even 200 metres. But, depending on wavelength and aperture size CW focus may not be so localised at 200 metres and beyond. In this case it is likely that pulsed LIDAR measurements may be better localised at the intended measurement point.

It is well known that LIDAR can operate in a pulsed mode, where the measurement range is determined by timing gates in the signal processing.

It is known that a three-dimensional wind velocity vector requires measurement of three components. The directions of three non-parallel beams form a set of directional basis vectors of the three-dimensional vector space. LIDAR has been typically used in the wind industry by employing diverging beams. This has the disadvantage of collecting numerous velocity components at widely separated points in space, thereby introducing error or generally false assumption of uniform wind flow, whereas in general wind flow is not entirely uniform.

A LIDAR system employing intersecting beams aimed to converge at a chosen measurement location is therefore superior to a LIDAR system which employs diverging beams, in the sense that the system is better designed to resolve the wind velocity vector at the intended measurement location, without any assumption of uniform flow and without errors due to the spatial averaging of a diverging beam system.

Historically wind farm and wind turbine deployment locations have been prospected primarily by collection or calculation of data indicating average wind speed or wind speed and direction distribution at the wind turbine hub height. Analysis has sometimes been undertaken to estimate the turbulence intensity.

Historically wind turbines have been produced and sold according to a classification system based upon data such as the average hub height wind speed, the turbulence intensity and the fifty-year extreme wind speed.

However, as wind turbine rotors get larger it is clear that wind vector field across the rotor area frequently includes non-standard and non-uniform variations which can give rise to very high loads.

Many types of condition monitoring system exist, such as from but not limited to drive train vibration sensor data, blade deflection sensor data, blade strain gauge data, tower deflection sensor data, tower strain gauge data, foundation deflection sensor data and foundation strain gauge data. Deflection can be spatial displacement and/or angular displacement. Vibration sensors may be accelerometers.

By combining condition monitoring systems with 3d wind vector field mapping one can correlate specific wind signatures or groups of wind signatures and the largest condition monitoring signals. Therefore, one can train an alarm and warning system to trigger an alarm or warning when particular wind signatures are observed by the LIDAR system. Such alarms and warnings may be transmitted to a wind turbine control system which may be programmed to initiate protective actions within the pitch system, yaw system, generator torque control or other control parameters, thereby reducing the impact of the damaging wind signatures in order to protect the wind turbine components, avoid reduction of overall system or component lifetime and to reduce operations and maintenance (O&M) interventions which may imply manpower costs, replacement component costs, repair costs, turbine lost generation due to downtime costs and associated equipment hire costs such as crane hire or service vessel costs.

Condition monitoring system data may be collected per turbine over a portion of turbine lifetime or the entire turbine lifetime. This can indicate the extreme loads as well as the cumulative fatigue loads to which the turbine is subjected. The proposed LIDAR system data may equally be collected over a portion of turbine lifetime or over the entire turbine lifetime. This can indicate the extreme wind signatures as well as the overall wind regime to which the turbine is subjected. Therefore, condition monitoring data and/or LIDAR data can inform wind turbine design engineers in order to correctly specify components and optimise cost-benefit. Therefore, LIDAR data can enable more effective lower cost wind turbine specification for given wind regime classes. Wind regime classes need not be specified only in terms of single point hub height wind speed and single point hub height turbulence intensity. New wind regime classes may be introduced to account for the wind characteristics found to be most relevant to wind turbine loads and bending moments.

Therefore, LIDAR sensor systems which are capable of resolving the wind characteristics found to be most relevant to wind turbine loads and bending moments may be deployed during the wind farm prospecting phase of project planning and development. This will enable wind farm developers to better assess lifetime fatigue loads and lifetime extreme loads, and thereby select the most appropriate wind turbine classification for a given site.

It has been appreciated that there is a problem of over-specifying and over-engineering of wind turbines because they are being engineered to operate under wind conditions which are not sufficiently specified in order to avoid the worst loads, and that a more comprehensive wind measurement system could be used in order to measure and characterise the most damaging wind signatures. Combining the wind vector field measurement system with condition monitoring sensor information enables the identification of complex wind vector field patterns which are associated or correlated with the largest and worst loads measured by the condition monitoring sensors.

Once we have identified the complex wind vector field patterns which are correlated with the largest loads then this information can be used at a wind farm prospecting site by checking for the frequency of such damaging wind signatures. Therefore, it would be possible to collect wind vector field data over an extended time period such as one year and extrapolate the complex wind conditions over a wind turbine or wind farm lifetime for the given location. This information can be used to characterise, rank or compare numerous prospective wind turbine or wind farm locations. Therefore, this invention enables more effective wind farm prospecting, allowing the avoidance of complex wind vector fields which tend to damage wind turbines.

Additionally, this information can be used in order to select better suited wind turbine classifications for a given site, in case such engineering classifications take account of the relevant wind vector field signatures. This could reduce probability of failure and reduce maintenance costs over the lifetime of a wind turbine or wind farm.

Another problem solved by this invention is to describe a device which can easily be deployed on any wind turbine with a column or tower since a suitable frame may be conveniently attached to the tower. This can be fitted to both onshore and offshore wind turbines but is particularly useful at an offshore wind turbine where it is impossible to deploy such LIDAR devices on the ground.

Apart from offering measurement information on the frequency of damaging wind signatures the present invention, when mounted on the column or tower of an operational wind turbine allows for the look-ahead advance measurement of incoming wind conditions. This can be beneficial for the wind turbine control system which may use the information in order to harvest more energy from the incoming wind, or may use the information in order to trigger alarms and protective measures which may alleviate loads on wind turbine components.

For instance, detection of imminent incoming extreme gusts could trigger and alarm signal which would in turn initiate an adjustment to blade pitch control to prepare the turbine for the imminent gust in such a way as to alleviate the loads.

For instance, by utilising the wind direction information across the entire rotor the control system could apply yaw commands which steer the wind turbine more effectively into the wind, thereby harvesting the maximum possible power.

It will be appreciated that there are many ways in which the wind turbine control system could respond advantageously to the wind vector field data from this invention.

Once a wind turbine manufacturer was confident that warnings and alarms from such a LIDAR system could be used to initiate protective actions for the wind turbine in order to avoid large loads and reduce average loads, such as through blade pitch control, then it could be possible for the wind turbine manufacturer to incorporate smaller safety factors and engineer the turbine to withstand lower lifetime loads, fatigue loads or critical loads. This could substantially lower the cost of manufacture of wind turbines, thereby reducing the cost of wind energy.

An alternative deployment in the offshore environment is achievable by the proposed invention by use of one or more buoy-mounted LIDAR systems. This type of deployment can be beneficial for offshore wind prospecting.

It will be appreciated that there are many possible variations in shape and design of a LIDAR buoy but that the essential aspect is that the buoy serves as a floating supporting column to which is attached a frame or arms extending to support a plurality of LIDAR optical heads whose beams are arranged to intersect or converge at chosen measurement locations.

The buoy may be deployed to float in a fluid such as sea water or lake water. The buoy may include power generation devices such as solar panels, wind turbines, fuel cells, batteries, etc. These power sources may be used to power the LIDAR system. The buoy may be anchored or tethered to the sea bed.

The advantage of such a system is that it enables three-dimensional wind vector measurement at a chosen location, in the absence of a land-based mounting location. In case that the beams are steerable or switchable in direction then it can be possible to produce three-dimensional maps of the wind vector field which can be of benefit to the offshore wind industry as described elsewhere within this document.

A buoy may include position sensing equipment such as Global Positioning System (GPS), differential GPS, or other position sensors. Position sensing equipment enables measurement of displacement of the system from a nominal operating position (such as heave, sway and surge parameters). A buoy may be equipped with attitude sensing equipment in order to measure its roll, pitch and yaw angle. Therefore, it is possible to supply sufficient data (including the shape and dimensions of the buoy and its optical heads) in order to correct the beam steering for any motion of the buoy. The relative position of individual sensors with regard to the buoy's centre of mass may also be taken into account. Therefore, the wind vector measurements can be made despite any motion of a buoy.

In one embodiment three buoys are employed, each having its own position and orientation sensor system, and each having a beam steering system to enable all three buoys to aim their beams to intersect at a chosen measurement location. Many such measurements may be combined into vector field map. The buoys may be tethered to one or more fixing points. The advantage of such a system would be to enable large baseline distance between the beam steering systems in order to ensure that the beams have substantial angle between them. Ensuring a substantial angle between the beams enables the resolution of all three orthogonal vector components.

Instead of employing one or more buoys as a platform for the intersecting beam LIDAR system it would be possible to employ one or more vehicles such as boats or remotely operated vehicles. Vehicles may be manned or unmanned. Vehicles may be submarine vessels, surface vessels, aerial vehicles or space vehicles such as satellites.

Alternatively, the system can be deployed fixed to a meteorological mast, either onshore or at an offshore mast which can have an underwater substructure and foundation, as an offshore wind turbine may have an underwater substructure and foundation. It is clear that a meteorological mast or a wind turbine can be mounted on a floating foundation and that it is possible to tether or anchor such floating foundations to suitable locations, possibly at the sea bed.

It will be appreciated that by sensing the overall average wind direction, or rotor averaged wind direction, in the absence of any wind turbine, it is nevertheless possible to arrange to gather wind vector field data at the set of locations (or rotor area region) where a proposed wind turbine rotor would be and on the basis that its rotor plane were generally oriented normal to the average wind direction, and given that the wind turbine deployment location and size is known.

Furthermore, it will be appreciated that by densely sampling a region of space the wind vector field across various prospective wind turbine rotors could be calculated and characterised instantaneously or over an extended time period. Therefore, this invention further enables advanced wind prospecting by providing a means to estimate and compare the expected output from different turbine types, as well as characterising and predicting the loads to be expected on the different turbines.

It is noted that different turbines may have varying dimensions such as rotor size and tower or hub height. It is also noted that different turbines may have different material properties such as structural stiffness of tower and blades.

Three or more structural arms extending radially from a column can be used to bear three or more LIDAR beam units or optical heads and that power cables and/or optical fibres could be fed to the optical heads along the arms from a central control unit and optical unit. Any measurement position outside a plane defined by the three optical head positions could have its wind velocity resolved by intersecting three radial Doppler measurement beams, aimed from each of the optical heads towards the chosen measurement position, and correctly combining the three corresponding radial velocity components.

Where the mounting column is of substantial size, such as a wind turbine tower, then such a measurement system may have blind spots where the intended measurement location is behind the tower, or behind a blade, or behind a rotor hub, or behind a nacelle, with respect to one or more of the optical heads. From this perspective it can be advantageous to employ more than three arms with optical heads, such as four or six.

In case of a wind turbine mounted system with more than three optical heads then beams can be selected on the basis of which optical heads have an unimpeded or unobstructed line of sight to the intended measurement position. Such calculation may take into account the tower size and position, wind turbine blades size and position, and other known obstacles as appropriate. Rotor position sensor, encoder data and other data may be employed by the optical head selection algorithm.

In case of a wind turbine mounted system with six optical heads then three may be aimed to a measurement point upwind whilst the other three may be aimed at a measurement point in the wake of the turbine, or elsewhere as required.

It will be appreciated that there are various ways in which the LIDAR frame may be attached to the column, including use of tension straps, use of elastic straps, use of buckles, use of ratchet straps, drilling and bolting, use of glue/bonding agent, use of brackets, use of magnets, locking joint, etc.

A conveniently adjustable fixing method may be offered in order that a single LIDAR product could be fixed to many different types of wind turbine, many different types of buoy and many types of met mast.

A mechanical means by which to raise or lower the arms of the LIDAR frame, or to conveniently remove the frame entirely, can be offered in order to avoid interfering with winching operations or other service actions. An automatic remote control signal could initiate the stowing process.

It could be possible that the LIDAR frame is borne on a type of yaw ring which could automatically rotate around the tower by employing yaw motorisation. Such motion could be accurately controlled by use of a yaw position encoder.

In case of a wind turbine it is noted that a wind turbine tower may support a vertical axis wind turbine or a horizontal axis wind turbine. In case of a vertical axis wind turbine it is possible that a fixed tower can extend above the rotating turbine as well as below the rotating turbine. In case of a horizontal axis wind turbine it is noted that the lower tower section includes a range of heights which would be below the rotor sweep of the blades and yet substantially above ground or sea level so as not to interfere with the normal passage of vehicles, personnel, equipment or service vessels. For the purpose of this invention the term wind turbine is also meant to cover wind pumps.

The main aim of this invention is for the wind industry but the equipment could be applied for fluid velocity vector field measurement in other industries or environments, such as for turbulence or other wind measurement at and around airport runways.

It is appreciated that different methods of calibration of the beam system are possible. Calibration can cover wind velocity measurement accuracy as well as beam steering angular accuracy, and other parameters of the system.

This measurement system can characterise many different wind parameters such as flow inclination, horizontal and vertical wind shear, horizontal and vertical wind veer, turbulence intensity, gusts and general vector fields.

This measurement system can measure rotor averaged wind speed, rotor averaged wind direction, rotor averaged turbulence intensity, rotor averaged yaw error and other rotor averaged wind statistics.

Apart from measuring wind fields this beam measurement system could be arranged in order to measure other vector fields or flow fields such as hydraulic velocity field, tidal flow or gas flow field. For instance, one embodiment could be a buoy mounted system which simultaneously offers measurement of offshore wind vector field using 3d LIDAR above water and tidal flow field using 3d SONAR intersecting beams underwater.

The systems described here may alternate the operation of three beams in order to collect data without interference from another beam. Alternatively, all three beams may operate simultaneously on the basis that interference between the different beams is minimal. Alternatively, the beams may be encoded by frequency, polarisation or pulse chain interval encoding in order to discriminate between the different beams.

In this text it is considered that a system which enables measurement of a parameter, equally enables estimation of the parameter, and equally enables calculation of the parameter. In this text a measurement of a parameter can be taken as an estimate of the parameter and vice versa, and a measurement of a parameter can be taken as a calculation of the parameter and vice versa.

Figure 1:
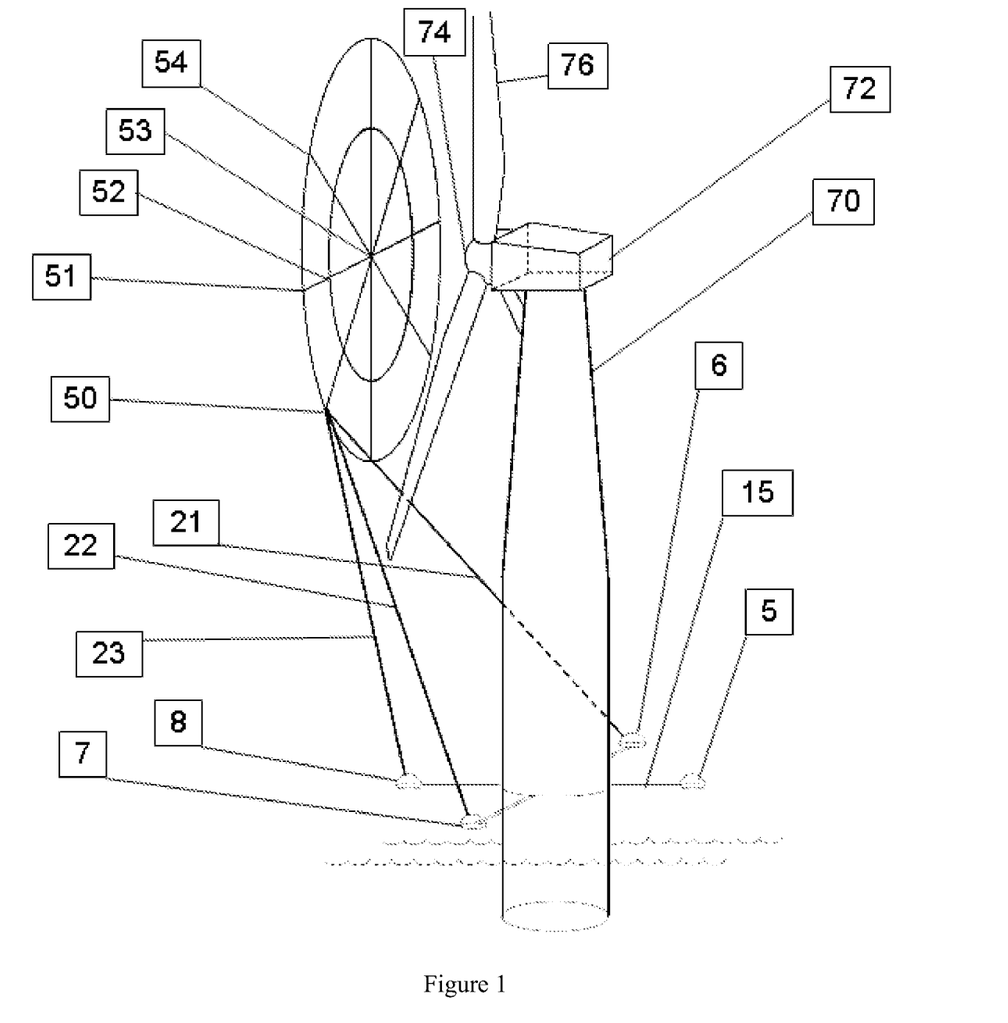
FIG. 1 shows a wind turbine with four LIDAR heads mounted on its tower, three of which combine radial measurements in order to resolve the wind velocity at a chosen point within a measurement map in front of the turbine rotor.

The invention is also illustrated in the accompanying figures. FIG. 1 shows a wind turbine including tower 70, nacelle 72, rotor hub 74 and blades 76. A measurement region in front of the rotor is made up of a map of measurement locations including 50, 51, 52, 53 and 54. Attached to the column of the tower is a frame including arms 15 bearing a LIDAR optical head 5. This figure depicts second, third and fourth LIDAR optical heads (6, 7, 8) similarly mounted. Three of the LIDAR optical heads 6, 7 and 8 are selected such that their beams 21, 22 and 23 respectively converge at a chosen measurement point 50.

Figure 2:
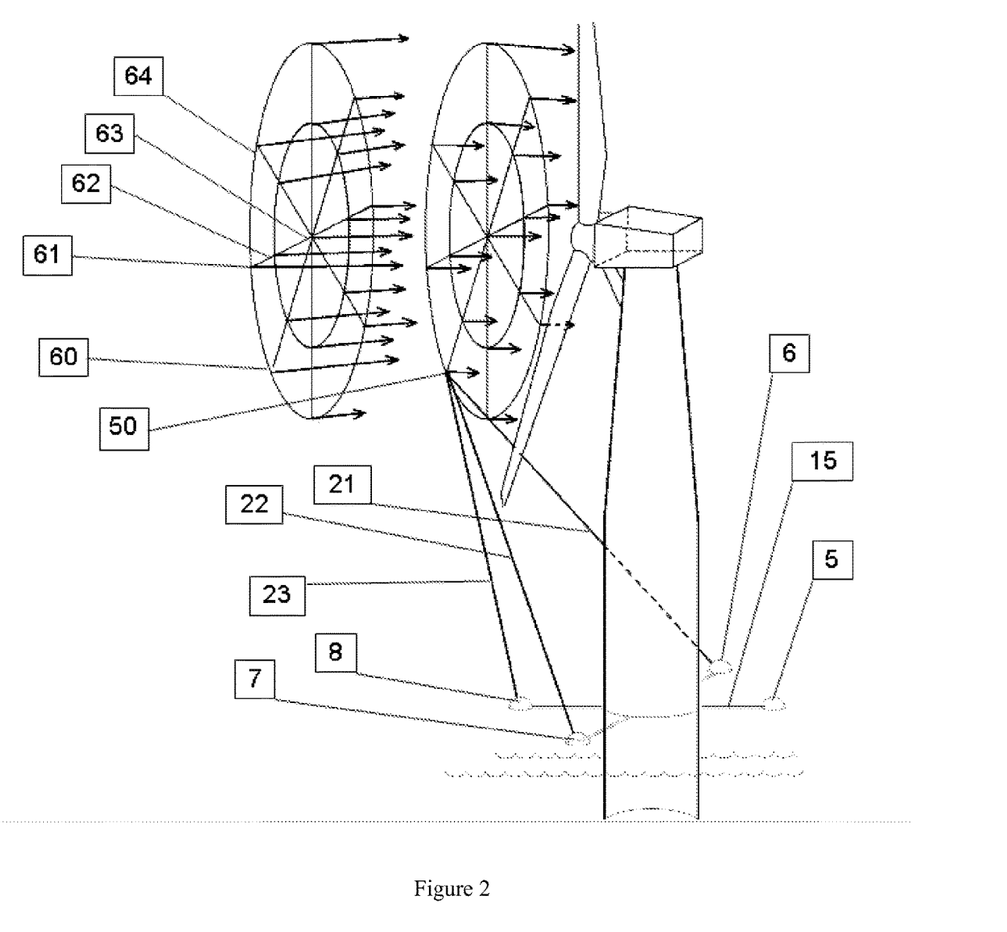
FIG. 2 shows the combination of numerous vector measurements in order to build up a map of the variation in wind vector field at different distances in front of the wind turbine rotor, in order to detect changing wind conditions before they impact the rotor.

FIG. 2 is as FIG. 1 but includes a further set of measurement locations, where wind velocity vector may be locally resolved by the convergence of three beams, including points 60, 61, 62, 63 and 64. The arrows indicate wind velocity vectors and the Figure depicts a changing wind field such as may occur when a sudden damaging gust is incoming towards the rotor.

Figure 3:
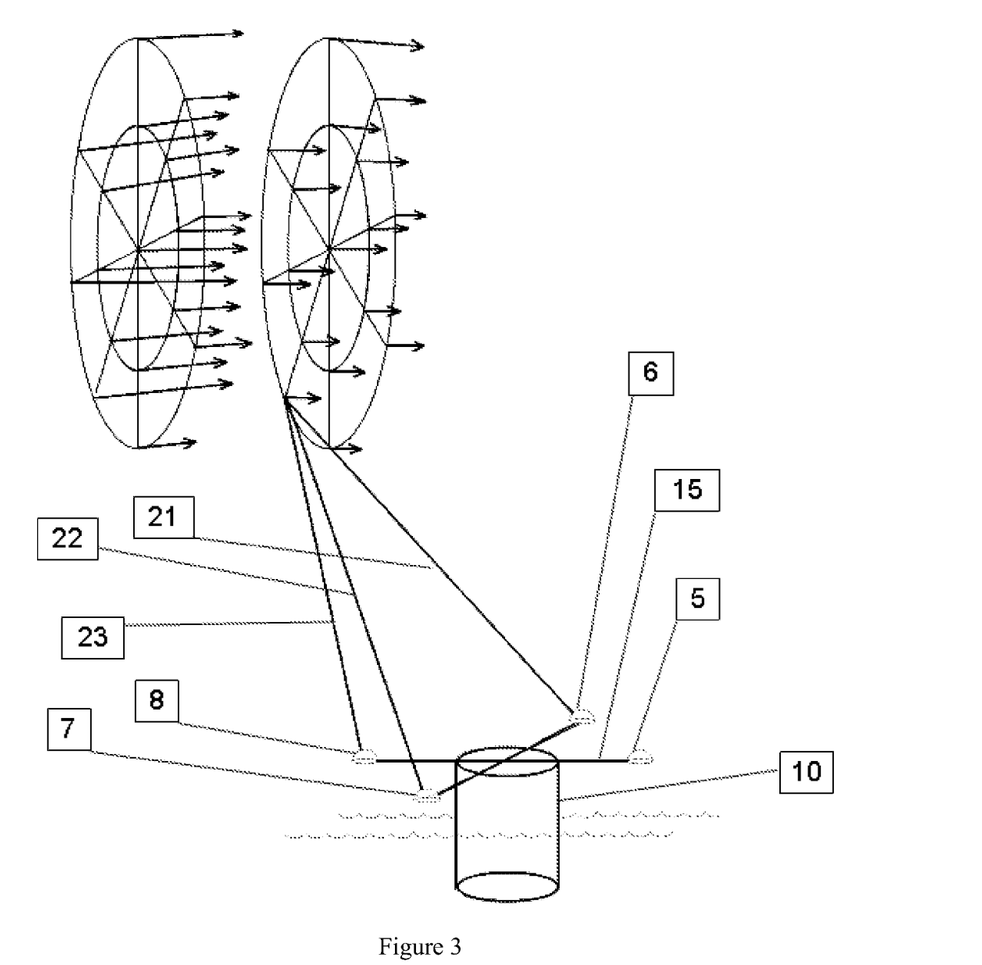
FIG. 3 shows that a buoy mounted system can build up a measurement map in order to measure the wind conditions which would be witnessed by a wind turbine if it were located at or near the buoy location.

FIG. 3 illustrates the fact that a buoy mounted system may be employed to measure the wind field which would have been experienced by a wind turbine had the wind turbine rotor been located at the position where the measurements are collected. A buoy 10 has a frame attached including arms 15 which bear LIDAR optical heads 5. Further optical heads 6, 7 and 8 are depicted to aim their beams 21, 22 and 23 respectively such that they converge at a measurement location.

Figure 4:
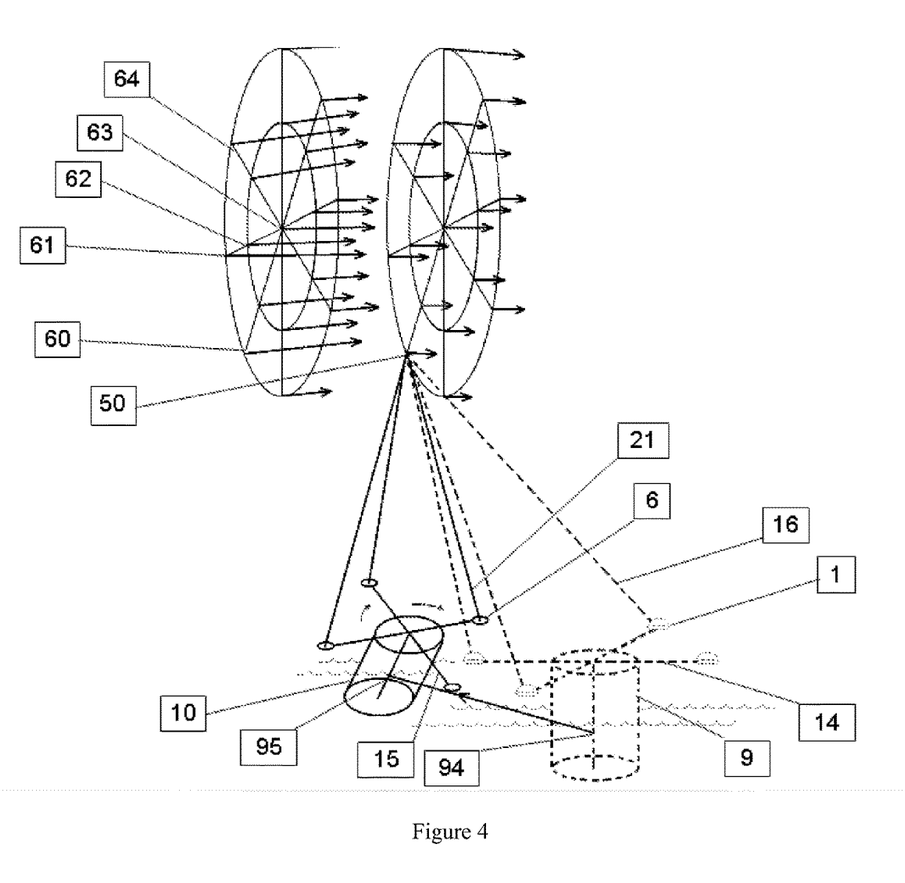
FIG. 4 shows that the beam steering can be compensated for any position displacement or changes in orientation of the buoy, so that the wind velocity measurement can be precisely compensated for the motion of the buoy, as if it never moved.
Figure 5:
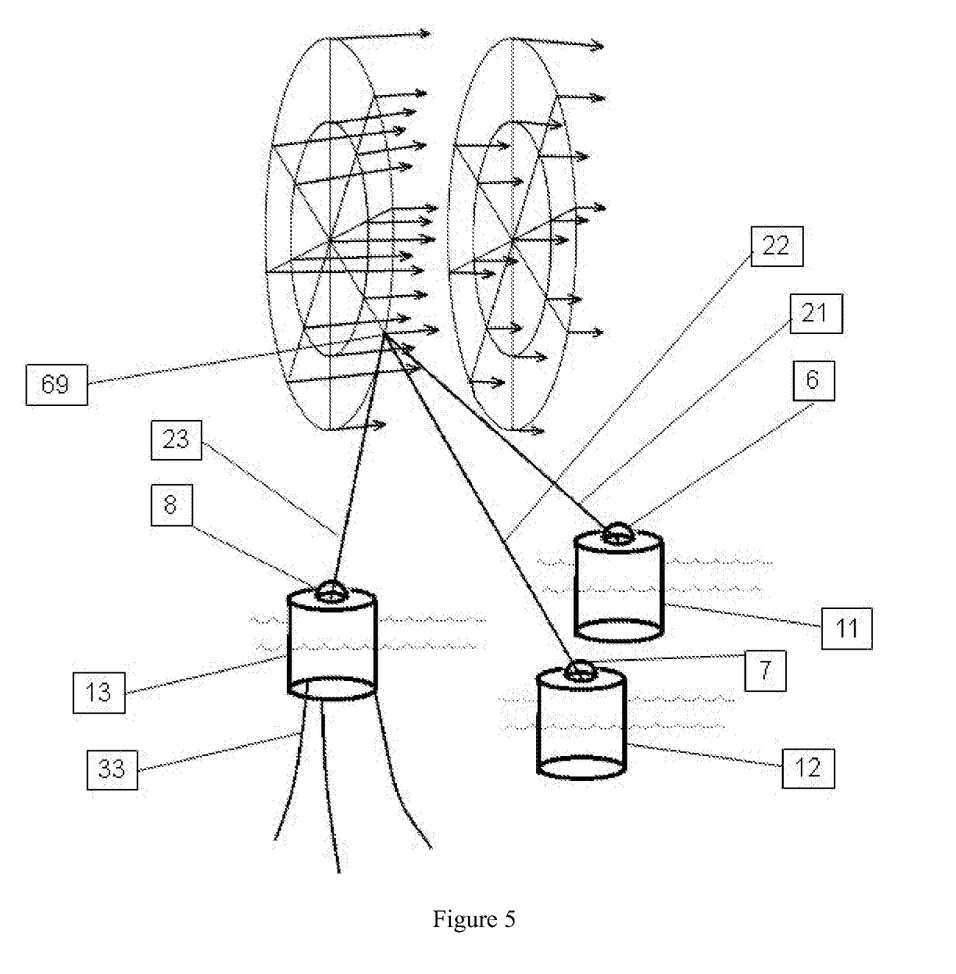
FIG. 5 shows three buoys, each with a single steerable beam, where the three beams cooperate to intersect at a chosen measurement point.

FIG. 4 depicts the buoy 10 of FIG. 3 but illustrates the fact that the buoy position and orientation may move over time. By incorporating sensors, the system can adjust the beam steering such that the beam 21 from optical head 6 remains well aimed at the measurement point 50 despite roll, pitch and yaw of the buoy whose centre of mass may have moved from a first position 94 to a second position 95. Therefore, the buoy mounted system can reconstruct a measurement map including a plurality of measurement points despite the buoy's motion. FIG. 5 shows a system of three buoys 11, 12 and 13 bearing LIDAR optical heads 6, 7 and 8 respectively whose respective beams 21, 22 and 23 are aimed to converge at a measurement point 69 which may be one of many measurement points within a measurement map or measurement region. One buoy 13 is shown to be held in place by one or more tethers 33.

The invention claimed is:

1. A measurement system for measuring a vector field at a measurement locale comprising:
   at least one floating structure;
   a plurality of beam transceivers for emitting beams and receiving reflected or scattered beams, said plurality of beam transceivers being mounted on either a single floating structure or on a plurality of floating structures, and being arranged such that beams emitted by the beam transceivers intersect at the measurement locale; and further comprising:
   a control system arranged to change a direction of the beams emitted from the beam transceivers;
   position sensing equipment enabling measurement of a displacement of the at least one floating structures from a nominal operating position;
   attitude sensing equipment arranged to measure an orientation of the at least one floating structure; and
   wherein said position sensing equipment and said attitude sensing equipment provide readings to the control system to adjust the beam steering to take account of motion of the or each floating structure.

2. The measurement system of claim 1, wherein the vector field is a fluid velocity.

3. The measurement system of claim 1, comprising a frame which carries a plurality of beam transceivers.

4. The measurement system of claim 1, wherein the or each floating structure is provided with or forms a meteorological mast or other column structure.

5. The measurement system of claim 1, wherein one or more of the beam transceivers comprises a spatially separated transmitter and receiver.

6. The measurement system of claim 1, wherein the control system is arranged to select, switch or steer a plurality of beams from the plurality of beam transceivers such that they intersect at the measurement locale.

7. The measurement system of claim 1, wherein transmitted and received beam parameters are measured and compared in order to calculate a Doppler shift thereby indicating a relative line of sight velocity component.

8. The measurement system of claim 1, wherein the beams are employed to measure or estimate a characteristic of a probed medium, as the characteristic comprising one or more of: density, turbulence intensity, flow inclination angle with respect to any plane such as horizontal plane, horizontal wind veer, vertical wind veer, horizontal wind shear, vertical wind shear, horizontal wind direction, wind speed, vertical wind speed or horizontal wind speed.

9. The measurement system of claim 1, wherein successive measurements in time are combined to measure or estimate rates of change of parameters of a probed medium.

10. The measurement system of claim 1, wherein a plurality of measurements are combined into a vector field spatial map extending through a region of space, or a vector field temporal map extending through a region of time.

11. The measurement system of claim 1, wherein the beams comprise one or more of: SODAR beams, RADAR beams, LIDAR beams, Doppler LIDAR beams, Continuous Wave (CW) LIDAR beams, or pulsed LIDAR beams.

12. The measurement system of claim 1, wherein two or more beams originate from two or more independent floating structures where the measurement system combines data from the independent floating structures in order to reconstruct parameters of the vector field.

13. The measurement system of claim 1, wherein vector field measurement data is provided to a wind turbine control system; or is combined with condition monitoring system data.

14. The measurement system of claim 13, wherein the control system utilises the measurement data in order to harvest more energy from wind; or to trigger alarms or protective measures in order to reduce or avoid damage to components.

15. The measurement system of claim 1, wherein measurements are analysed to derive a fluid density value; or wherein successive velocity measurements are employed to produce fluid acceleration measurements, or higher time derivatives of vector displacement.

16. The measurement system of claim 1, wherein a plurality of beam sources transmit at differing frequencies, pulse repetition frequencies or with different polarisation characteristics.

17. The measurement system of claim 1, wherein the beams are encoded by frequency, polarisation or pulse chain interval encoding in order to discriminate between the different beams.

18. The measurement system of claim 1, wherein the orientation measured by the attitude sensing equipment comprises roll, pitch and yaw angle data.

19. A computer program product comprising instructions that when executed by a processor forming part of a measurement system, provide the measurement system of claim 1.

20. A method of measuring a vector field at a measurement locale comprising:
   providing a plurality of beam transceivers emitting beams and receiving reflected or scattered beams, said plurality of beam transceivers being mounted on either a single floating structure or on a plurality of floating structures; wherein beams emitted by the beam transceivers intersect at the measurement locale; and measuring a displacement of the or each floating structure from a nominal operating position;
measuring an orientation of the or each floating structure; and
changing a direction of the beams emitted from the beam transceivers based on measured displacement, roll, pitch, and yaw angle to take account of the motion of the or each floating structure.

* * * * *